United States Patent
Lee et al.

(10) Patent No.: US 8,181,030 B2
(45) Date of Patent: May 15, 2012

(54) BUNDLE AUTHENTICATION SYSTEM AND METHOD

(75) Inventors: Hyun Woo Lee, Daejeon (KR); Kwi Hoon Kim, Daejeon (KR); Won Ryu, Daejeon (KR); Sou Hwan Jung, Seoul (KR); Ki Hun Hong, Seoul (KR)

(73) Assignees: Electronics and Telecommunications Research Institute, Daejeon (KR); Soongsil University Foundation of University-Industry Cooperation, Seoul (KR)

( * ) Notice: Subject to any disclaimer, the term of this patent is extended or adjusted under 35 U.S.C. 154(b) by 408 days.

(21) Appl. No.: 12/629,399

(22) Filed: Dec. 2, 2009

(65) Prior Publication Data

US 2010/0135487 A1   Jun. 3, 2010

(30) Foreign Application Priority Data

Dec. 2, 2008   (KR) .................. 10-2008-0121510
May 26, 2009   (KR) .................. 10-2009-0046023

(51) Int. Cl.
*G06F 21/00* (2006.01)
*H04M 1/66* (2006.01)
*H04M 1/68* (2006.01)
*H04M 3/16* (2006.01)

(52) U.S. Cl. ............ 713/185; 455/410; 455/411; 726/4; 726/7

(58) Field of Classification Search .................. 713/185; 455/410, 411
See application file for complete search history.

(56) References Cited

U.S. PATENT DOCUMENTS

| 7,600,116 | B2 * | 10/2009 | Bajko et al. | 713/166 |
|---|---|---|---|---|
| 7,676,041 | B2 * | 3/2010 | Horn et al. | 380/278 |
| 7,783,771 | B2 * | 8/2010 | Pantalone | 709/230 |
| 7,796,990 | B2 * | 9/2010 | Matuszewski et al. | 455/435.1 |
| 7,933,591 | B2 * | 4/2011 | Blom et al. | 455/419 |
| 2003/0200431 | A1 * | 10/2003 | Stirbu | 713/168 |
| 2005/0097363 | A1 * | 5/2005 | Bajko et al. | 713/201 |
| 2005/0278420 | A1 * | 12/2005 | Hartikainen et al. | 709/203 |
| 2006/0253703 | A1 * | 11/2006 | Eronen et al. | 713/156 |
| 2006/0276137 | A1 * | 12/2006 | Pummill et al. | 455/67.11 |
| 2007/0022476 | A1 * | 1/2007 | Bae et al. | 726/15 |
| 2007/0192602 | A1 * | 8/2007 | Blom et al. | 713/169 |
| 2008/0020789 | A1 * | 1/2008 | Yan et al. | 455/466 |

(Continued)

FOREIGN PATENT DOCUMENTS

KR   1020000033498   6/2000

(Continued)

OTHER PUBLICATIONS

H. Haverinen & J. Salowey. RFC 4186: Extensible Authentication Protocol Method for Global System for Mobile Communications (GSM) Subscriber Indentity Modules (EAP-SIM). Jan. 2006. p. 1-93.*

(Continued)

*Primary Examiner* — Christian LaForgia
(74) *Attorney, Agent, or Firm* — Nelson Mullins Riley & Scarborough LLP; EuiHoon Lee, Esq.

(57) ABSTRACT

There is provided a bundle authentication system and method that can perform network access authentication and authentication at a service request in a next generation network utilizing a Bundled Authentication Key (BAK) generated by using an Extended Master Session Key (EMSK) that is an encryption key generated during access authentication.

16 Claims, 5 Drawing Sheets

U.S. PATENT DOCUMENTS

| | | | |
|---|---|---|---|
| 2008/0064369 A1* | 3/2008 | Xie et al. | 455/411 |
| 2008/0070543 A1* | 3/2008 | Matuszewski et al. | 455/404.1 |
| 2008/0108322 A1* | 5/2008 | Upp | 455/411 |
| 2008/0171534 A1* | 7/2008 | Holtmanns et al. | 455/411 |
| 2008/0216167 A1* | 9/2008 | Imai et al. | 726/12 |
| 2009/0067417 A1* | 3/2009 | Kalavade et al. | 370/356 |
| 2009/0093249 A1* | 4/2009 | Zhu et al. | 455/433 |
| 2009/0268635 A1* | 10/2009 | Gallagher et al. | 370/254 |
| 2010/0054222 A1* | 3/2010 | Rune | 370/338 |
| 2010/0146610 A1* | 6/2010 | Kim et al. | 726/7 |
| 2010/0268937 A1* | 10/2010 | Blom et al. | 713/153 |
| 2010/0333173 A1* | 12/2010 | Barriga et al. | 726/2 |
| 2011/0004754 A1* | 1/2011 | Walker et al. | 713/168 |
| 2011/0064219 A1* | 3/2011 | Edlund et al. | 380/211 |
| 2012/0036270 A1* | 2/2012 | Bullon et al. | 709/227 |

FOREIGN PATENT DOCUMENTS

| | | |
|---|---|---|
| KR | 1020070024116 | 3/2007 |

OTHER PUBLICATIONS

Giorgos Kostopoulos & Odysseas Koufopavlou. NASS-IMS bundled Authentication Study through Core Network Concepts. Mar. 8, 2007. p. 1-6.*

Peter Howard. AKA Usage in 3GPP. Jul. 6-9, 2004. p. 1-23.*

* cited by examiner

BUNDLE AUTHENTICATION SYSTEM AND METHOD

CROSS-REFERENCE TO RELATED APPLICATIONS

This application claims the priorities of Korean Patent Application Nos. 10-2009-0046023 filed on May 26, 2009 and 10-2008-0121510 filed on Dec. 2, 2008, in the Korean Intellectual Property Office, the disclosure of which is incorporated herein by reference.

BACKGROUND OF THE INVENTION

1. Field of the Invention

The present invention relates to a subscriber terminal, an integration authentication server, and a bundle authentication system and method having the same, and more particularly, to a bundle authentication system and method for network access and user authentication at a service request in a next generation network utilizing a Bundled Authentication Key (BAK) generated by using an Extended Master Session Key (EMSK) that is an encryption key generated during access authentication.

2. Description of the Related Art

An IP Multimedia Subsystem (IMS) is the core technology for delivering new services in next generation communications environments based on networks integrated using IP. Research into the IMS has been actively conducted. In particular, the development of the IMS has been undertaken in order to control mobile communications networks according to the 3rd Generation Partnership Project (3GPP). Further, revisions and supplements have been made such that the IMS can be applied to wired networks by a Next Generation Network (NGN) of Telecommunications and Internet converged Services and Protocols for Advanced Networks (TISPAN). Furthermore, research has been conducted to apply the IMS to the NGN structure defined in the International Telecommunication Union, Telecommunication Sector (ITU-T) so as to utilize the NGN as a standard platform in an IP-based wired/wireless integrated network. Various kinds of security technologies have been standardized to provide security in this environment.

However, in order for users to use services, network access authentications to access networks and service authentications to be provided with services are performed independently of each other in security frameworks currently being researched. In order to solve this problem, research into security frameworks for network access authentication and service for subscribers has been conducted. Network Attachment subsystem-IMS (NASS-IMS) bundle authentication has been currently proposed. According to the NASS-IMS bundle authentication, a process of extending successful authentication in the NASS layer to another layer is performed. While a subscriber performs a network access, the NASS authenticates the subscriber, allocates an IP address and stores second and third layer identifiers in an NASS profile. Then, when the subscriber transmits a request message to use services, a P-CSCF in an IMS network inquires of the NASS to obtain information about a user's location. When the NASS transmits subscriber information to the P-CSCF, the P-CSCF includes the location information in an SIP message and transmits the SIP message to the S-CSCF, which then verifies the user's location information. When receiving the message transmitted from the P-CSCF, the S-CSCF performs verification by comparing the transmitted subscriber's information with subscriber's location information obtained using a User Profile Server Function (UPSF) and performs authentication of the subscriber in the IMS layer if the verification succeeds. That is, when the subscriber registers with the IMS, it is important for the NASS to check a location at which the subscriber registers. When the checked location coincides with the location in the NASS, the user is authorized to access the IMS layer and is thus given the right to access IMS. As described above, the NASS-IMS bundle authentication provides bundle authentication on the basis of subscriber's location information.

In addition to the above-described NASS-IMS bundle authentication, bundle authentication is also performed on the basis of subscriber's IP information. According to this authentication, when a subscriber requests the use of services, subscriber's IP information is transmitted to the IMS layer and subscriber identification and authentication is then performed. According to the above-described bundle authentications being performed on the basis of subscriber's IP information or location information, bundle authentication can be performed using a simple method without adversely affecting the performance or without incurring overhead. However, IP information or location information used for bundle authentication is susceptible to forgery and theft by attackers, who may make attacks in various ways with the information. Therefore, there has been a need for bundle authentication that is safe from malicious attacks by attackers and does not burden the system like existing bundle authentication.

SUMMARY OF THE INVENTION

An aspect of the present invention provides bundle authentication safe from security attacks by utilizing a Bundled Authentication Key (BAK) generated by using an Extended Master Session Key (EMSK) that is an encryption key generated during access authentication.

According to an aspect of the present invention, there is provided a bundle authentication system including: a subscriber terminal calculating a Bundled Authentication Key (BAK) on the basis of an Extended Master Session Key (EMSK) obtained during access authentication and calculating an Auth value using the BAK and an IMS Private User Identity (IMPI) in order to check whether the subscriber terminal has succeeded with the access authentication; a first apparatus receiving a register message including the IMPI and the Auth value calculated by the subscriber terminal and then transmitting the IMPI included in the register message to an integration authentication server; and an integration authentication server performing the access authentication along with the subscriber terminal, calculating a BAK using the EMSK and an Auth value using the BAK and the IMPI after checking the IMPI transmitted from the first apparatus and finding out that the subscriber terminal is a registered subscriber terminal, and transmitting a response message including the Auth value, the BAK and the IMPI to the first apparatus, wherein the first apparatus receives and validates the response message and then transmits a registration success message including the IMPI, the Auth value and the BAK to the subscriber terminal.

The bundle authentication system may further include a second apparatus receiving the registration success message including the IMPI, the Auth value and the BAK transmitted by the first apparatus, storing the BAK therein, and transmitting the registration success message, from which the BAK is removed, to the subscriber terminal.

The access authentication may be based on an Extensible Authentication Protocol (EAP).

The BAK may be calculated on the basis of the EMSK using a pseudo-random function.

The Auth value may be calculated with the BAK using a pseudo-random function.

According to another aspect of the present invention, there is provided a bundle authentication method including: performing access authentication between a subscriber terminal and an integration authentication server; calculating, by the subscriber terminal, a Bundled Authentication Key (BAK) on the basis of an Extended Master Session Key (EMSK), obtained during the access authentication, and calculating an Auth value using the BAK and an IMS Private User Identity (IMPI) in order to check whether the subscriber terminal has succeeded in the access authentication; transmitting a register message including the IMPI and the Auth value calculated by the subscriber terminal to a first apparatus; transmitting, by the first apparatus, the IMPI included in the register message to the integration authentication server upon receiving the register message; calculating, by the integration authentication server, a BAK on the basis of the EMSK and calculating an Auth value using the BAK and the IMPI after checking the IMPI transmitted by the first apparatus and finding out the subscriber terminal is a registered subscriber terminal; transmitting a response message including the IMPI, the Auth value and the BAK calculated by the integration authentication server to the first apparatus; and transmitting, by the first apparatus, a registration success message including the Auth value, the BAK and the IMPI to the subscriber terminal after checking the Auth value and the IMPI included in the response message.

The transmitting of the registration success message to the subscriber terminal may further include storing the BAK from the registration success message, transmitted by the first apparatus, in the second apparatus and transmitting the registration success message, from which the BAK is removed, to the subscriber terminal.

The access authentication may be based on an Extensible Authentication Protocol (EAP).

The calculating of the BAK on the basis of the EMSK may be performed using a pseudo-random function.

The calculating of the Auth value using the BAK may be performed using a pseudo-random function.

According to another aspect of the present invention, there is provided a subscriber terminal including: a BAK generation unit generating a Bundled Authentication Key (BAK) on the basis of an Extended Master Session Key (EMSK) obtained when access authentication is performed between the subscriber terminal and a server; an IMPI storage unit storing an IMS Private User Identity (IMPI); and an Auth value generation unit generating an Auth value using the BAK and the IMPI in order to check whether the subscriber terminal has succeeded with the access authentication.

The BAK generation unit may include a pseudo-random function calculation part.

The Auth value generation unit may include a pseudo-random function calculation part.

According to another aspect of the present invention, there is provided an integration authentication server including: a BAK generation unit generating a Bundled Authentication Key (BAK) on the basis of an Extended Master Session Key (EMSK) obtained when access authentication is performed between a subscriber terminal and the integration authentication server; and an Auth value generation unit generating an Auth value using the BAK and an IMS Private User Identity (IMPI) transmitted from the subscriber terminal in order to check whether the subscriber terminal has succeeded with the access authentication.

The BAK generation unit may include a pseudo-random function calculation part.

The Auth value generation unit may include a pseudo-random function calculation part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
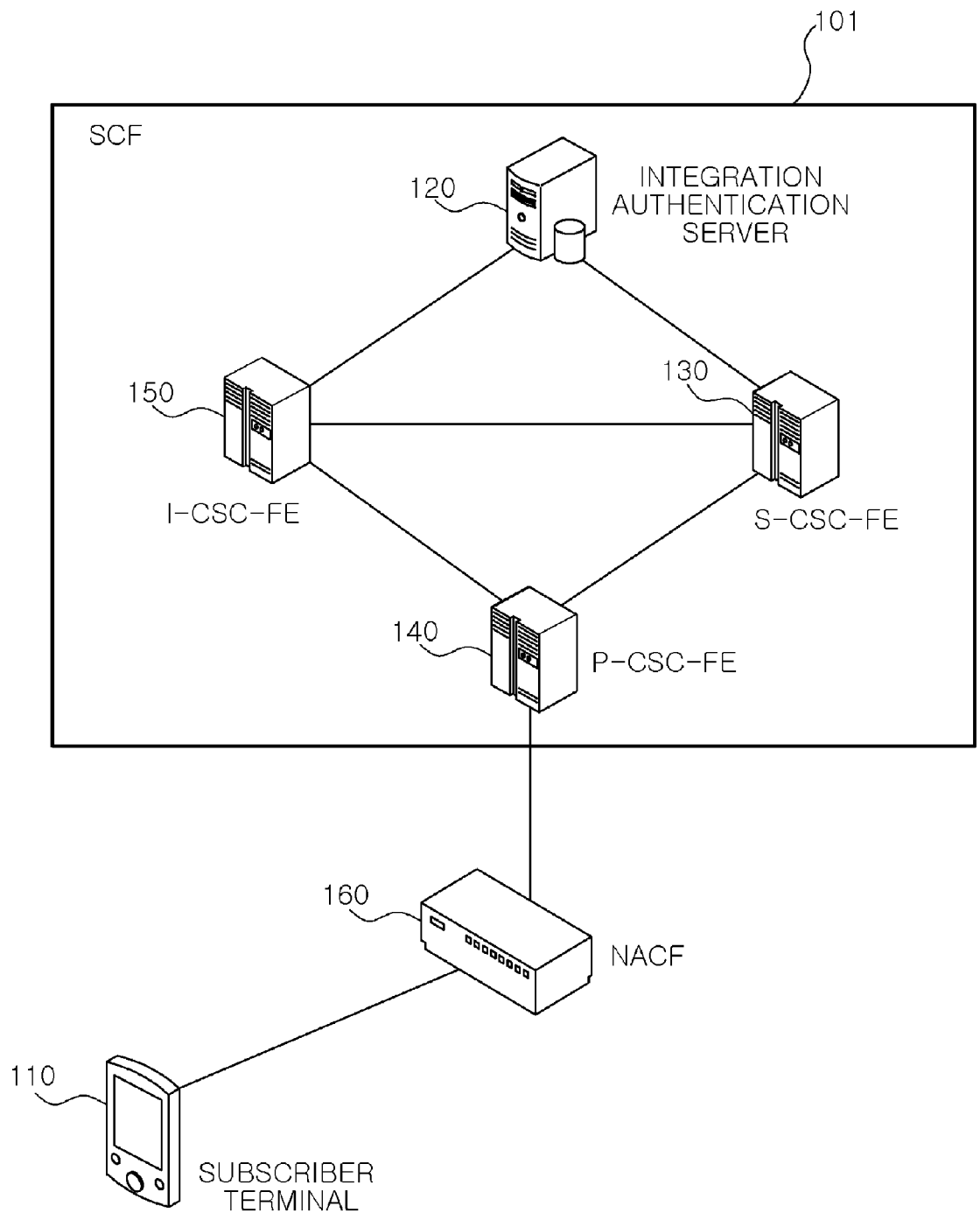
FIG. 1 is a view illustrating the configuration of a bundle authentication system according to an exemplary embodiment of the present invention.

FIG. 1 is view illustrating the configuration of a bundle authentication system according to an exemplary embodiment of the invention.

Referring to FIG. 1, a bundle authentication system according to this embodiment may have a subscriber terminal 110, an NACF 160 and an SCF 101 including a P-CSC-FE 140, an I-CSC-FE 150, an S-CSC-FE 130 and an integration authentication server 120. The bundle authentication system according to this embodiment may be a bundle authentication system for network access authentication and user authentication at a service request in a Next Generation Network (NGN).

The subscriber terminal 110 may calculate a Bundled Authentication Key (BAK) on the basis of an Extended Master Session Key (EMSK) obtained when performing access authentication and calculate an Auth value using the BAK and an IMS Private User Identity (IMPI) in order to check whether the subscriber terminal has succeeded in the access authentication.

This access authentication may be performed using an Extensible Authentication Protocol (EAP). In this embodiment, the subscriber terminal 110 and the integration authentication server 120 may perform EAP-based access authentication and share a Transient EAP Key (TEK), a Master Session Key (MSK) and an Extended Master Session Key (EMSK). The bundle authentication system may generate a hierarchical key using the EMSK among the shared keys and provide the subscriber terminal with bundle authentication using the hierarchical key.

Figure 2:
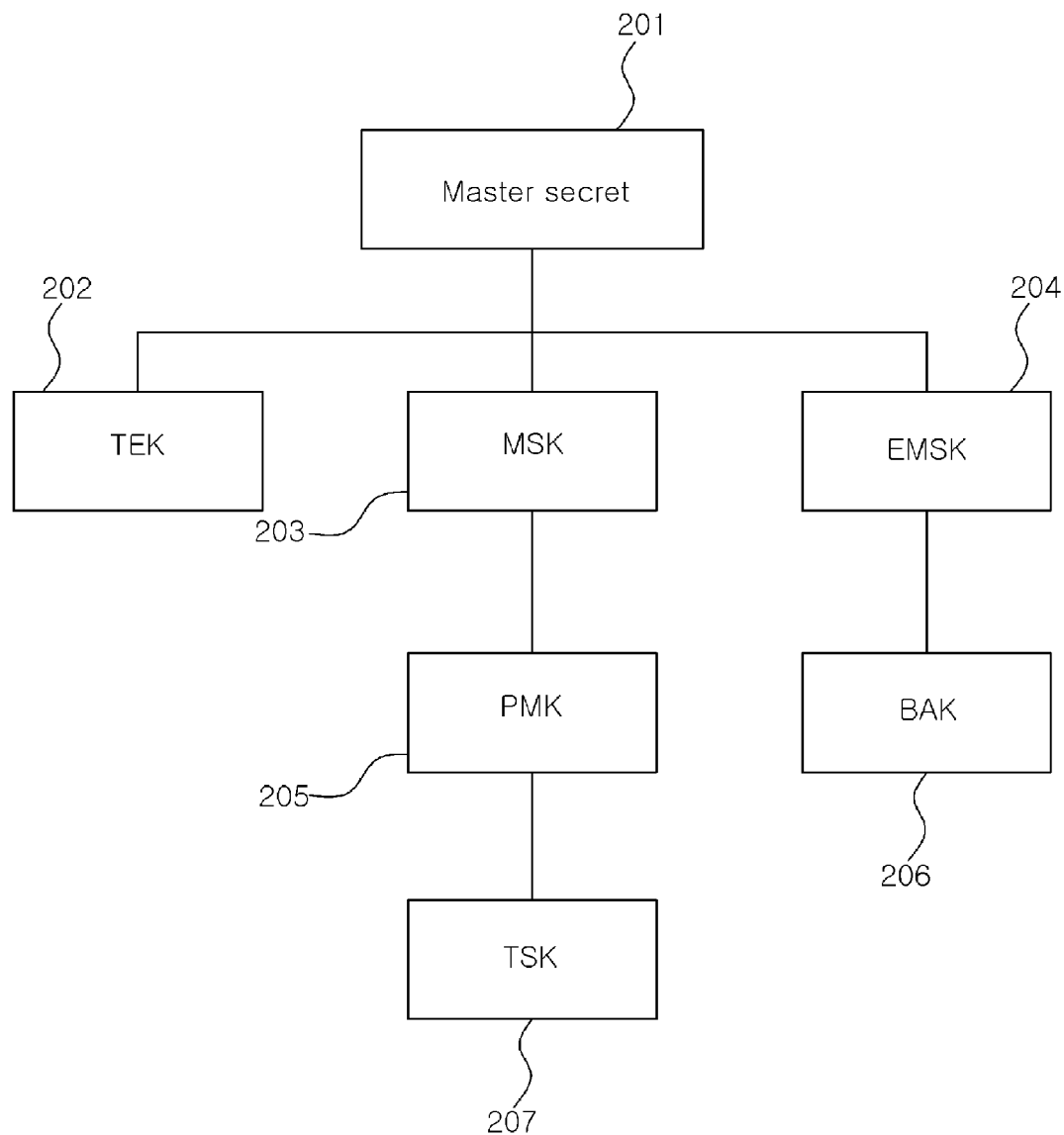
FIG. 2 is a view illustrating a structure of a hierarchical key used in a bundle authentication system according to an exemplary embodiment of the present invention.

FIG. 2 is a view illustrating a structure of a hierarchical key that is used in a bundle authentication system according to an exemplary embodiment of the invention. In this embodiment, an encryption key may be used to perform safer and more effective bundle authentication than existing bundle authentication being performed for a subscriber terminal by checking an IP. The encryption key, used in this embodiment, may be generated using an EMSK 204 among an MSK 203, the EMSK 204 and a TEK 202 that are derived from a master secret value 201 shared between the subscriber terminal and the authentication server in an initial authentication process for a network access being performed such that the subscriber terminal accesses a network. In this embodiment, a BAK 206 may be generated using the EMSK 204 generated in the initial authentication process. The BAK 206, which is generated using the EMSK 204, satisfies the following equation:

$$BAK=PRF(EMSK,IMPI|\text{bundled Authentication Key}) \quad \text{Equation 1}$$

Here, the PRF can be defined as a pseudo-random function. The BAK can be obtained using the EMSK and the IMPI.

In this embodiment, an Auth value, which is calculated using the BAK, satisfies the following equation:

$$\text{Auth}=PRF(BAK,IMPI|t_p) \quad \text{Equation 2.}$$

Here, the PRF may be defined as a pseudo-random function. The Auth value can be obtained using the BAK and the IMPI as input.

The NACF (Network Attachment Control Function) 160 may help the subscriber terminal to access the network.

The SCF (Service Control Function) 101 may be in charge of service routing and service authentication. Furthermore, the SCF 101 may include a Proxy Call Session Control Functional Entity (P-CSC_FE) 140, an Interrogating Call Session Control Functional Entity (I-CSC-FE) 150, a Serving Call Session Control Functional Entity (S-CSC-FE) 130 and an integration authentication server 120.

The P-CSC_FE 140 may be in charge of routing and service authentication. The P-CSC-FE 140 may check whether the subscriber terminal 110 registers with an NACF-SCF bundle.

When receiving a register message including the IMPI and the Auth value calculated by the subscriber terminal 110, the S-CSC-FE (Serving Call Session Control Functional Entity) 130 may transmit the IMPI included in the register message to the integration authentication server 120.

The integration authentication server 120 may execute access authentication along with the subscriber terminal 110, calculate a BAK on the basis of the EMSK, calculate an Auth value using the BAK and the IMPI after checking the IMPI transmitted from the S-CSC-FE 130 and finding out the subscriber terminal is a registered subscriber terminal, and transmit a response message including the Auth value, the BAK and the IMPI to the S-CSC-FE 130. When the BAK and the Auth value calculated by the integration authentication server 120 are equal to the BAK and the Auth value calculated by the subscriber terminal 110, service authentication requested by the subscriber terminal can be performed. In this embodiment, the access authentication may be based on an Extensible Authentication Protocol (EAP). In this embodiment, after performing the EAP-based access authentication, the subscriber terminal 110 and the integration authentication server 120 can share a Transient EAP Key (TEK), a Master Session Key (MSK) and an Extended Master Session Key (EMSK). A hierarchical key may be generated using the EMSK among the shared keys and bundle authentication may be provided to the subscriber terminal through the hierarchical key.

The S-CSC-FE 130 may receive and validate the response message of the integration authentication server 120 and transmit a registration success message including the IMPI, the Auth value and the BAK to the subscriber terminal 110.

In this embodiment, the P-CSC-FE 140 and the I-CSC-FE 150 may transmit the register message the IMPI and the Auth value calculated by the subscriber terminal 110 from the subscriber terminal 110 to the S-CSC-FE 130. Furthermore, the registration success message including the IMPI, the BAK, and the Auth value calculated by the S-CSC-FE 130 to the subscriber terminal 110.

In this embodiment, the P-CSC-FE 140 may receive the registration success message, including the IMPI, the Auth value and the BAK, which is transmitted from the S-CSC-FE 130, store the BAK therein and transmit the registration success message, from which the BAK is removed, to the subscriber terminal 110. As such, in this embodiment, multimedia traffic security application and continuous authentication following the subscriber terminal authentication can be performed using the BAK stored in the P-CSC-FE 140. The integration authentication server, used in this embodiment, is an authentication server that integrates access authentication and service authentication. In the related art, service authentication is performed to access services after finishing access authentication, while in this embodiment, access authentication and service authentication are integrated in the authentication server.

Figure 3:
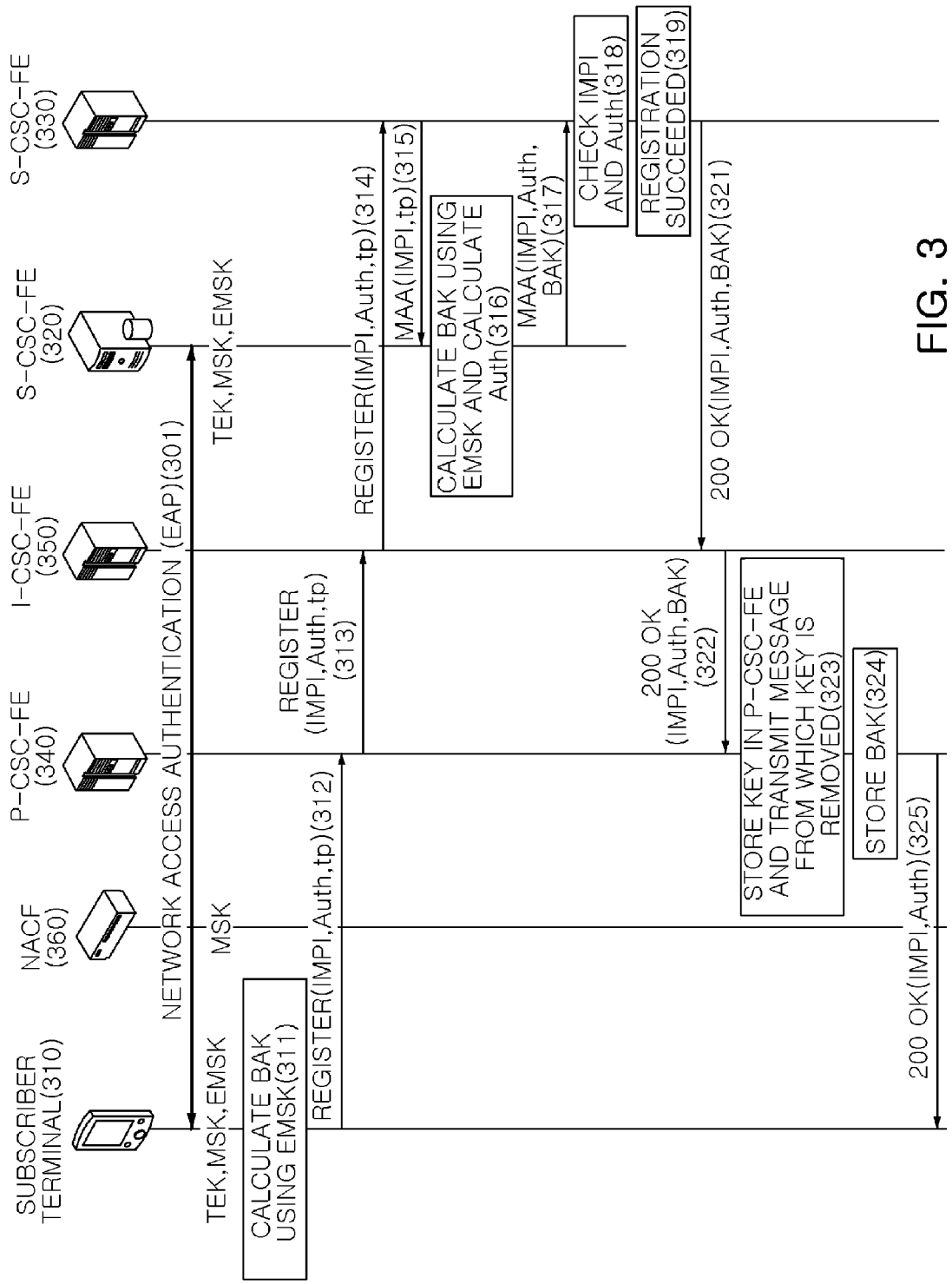
FIG. 3 is a flowchart illustrating a bundle authentication method according to another exemplary embodiment of the present invention.

FIG. 3 is a flowchart illustrating a bundle authentication method according to another exemplary embodiment of the invention.

Referring to FIG. 3, bundle authentication according to this embodiment may be network access authentication and bundle authentication at a service request.

In bundle authentication according to this embodiment, access authentication may be performed between a subscriber terminal 310 and an integration authentication server 320 at operation S301. In this embodiment, the access authentication may be based on an Extensible Authentication Protocol (EAP). After performing EAP-based access authentication, the subscriber terminal 310 and the integration authentication server 320 can share a Transient EAP Key (TEK), a Master Session Key (MSK) and an Extended Master Session Key (EMSK). A hierarchical key may be generated using the EMSK among the shared keys, and bundle authentication may be provided to the subscriber terminal using the hierarchical key.

after the access authentication has been performed, in order to perform an authentication procedure at a service request, the subscriber terminal 301 calculates a Bundled Authentication Key (BAK) using the EMSK obtained during the access authentication and calculates an Auth value using the BAK and an IMS Private User Identity (IMPI) in order to check whether the subscriber terminal has succeeded with the access authentication at operation S311.

Here, the process of calculating the BAK may be performed using a pseudo-random function by taking the EMSK and the IMPI as input. The process of calculating the Auth value may be performed using a pseudo-random function by taking the BAK and the IMPI as input.

A register message including the IMPI and the Auth value calculated by the subscriber terminal 310 may be transmitted to an S-CSC-FE 330 at operations S312, S313 and 314. In this embodiment, the register message may be transmitted to the S-CSC-FE 330 through a P-CSC-FE 340 and an I-CSC-FE 350.

When receiving the register message, the S-CSC-FE 330 may transmit the IMPI included in the register message to the integration authentication server 320 at operation S315. The IMPI, which is transmitted from the S-CSC-FE 330 to the integration authentication server 320, may be included in a request message in order to check whether the subscriber terminal is a registered subscriber terminal.

When the integration authentication server 320 checks the IMPI transmitted from the S-CSC-FE 330 and finds out that the subscriber terminal is a registered subscriber terminal, the integration authentication server 320 may calculate a BAK using the EMSK and an Auth value using the BAK and the IMPI at operation S316.

When the BAK and the Auth value calculated by the integration authentication server 320 are equal to the BAK and the Auth value calculated by the subscriber terminal 310, authentication for the service requested by the subscriber terminal can be performed.

The integration authentication server 320 may transmit a response message including the IMPI and the calculated Auth value and the BAK to the S-CSC-FE 330 at operation S317.

The S-CSC-FE 330 may check the Auth value and the IMPI included in the response message and transmit a registration success message including the Auth value, the BAK and the IMPI to the subscriber terminal 310 at operations S321, S322 and S325. When the Auth value calculated by the integration authentication server 320 is the same as the Auth value calculated by the subscriber terminal 310, the S-CSC-FE 330 may transmit the registration success message to the subscriber terminal.

In this embodiment, when the registration success message is transmitted to the subscriber terminal 310, the BAK from the registration success message, transmitted from the S-CSC-FE 330, may be stored in the P-CSC-FE 340, and the registration success message, from which the BAK is removed, may be transmitted to the subscriber terminal 310. As such, in this embodiment, the BAK is stored in the P-CSC-FE 340, and the BAK can be used for multimedia traffic security application and continuous authentication following the process of authenticating the subscriber terminal.

Figure 4:
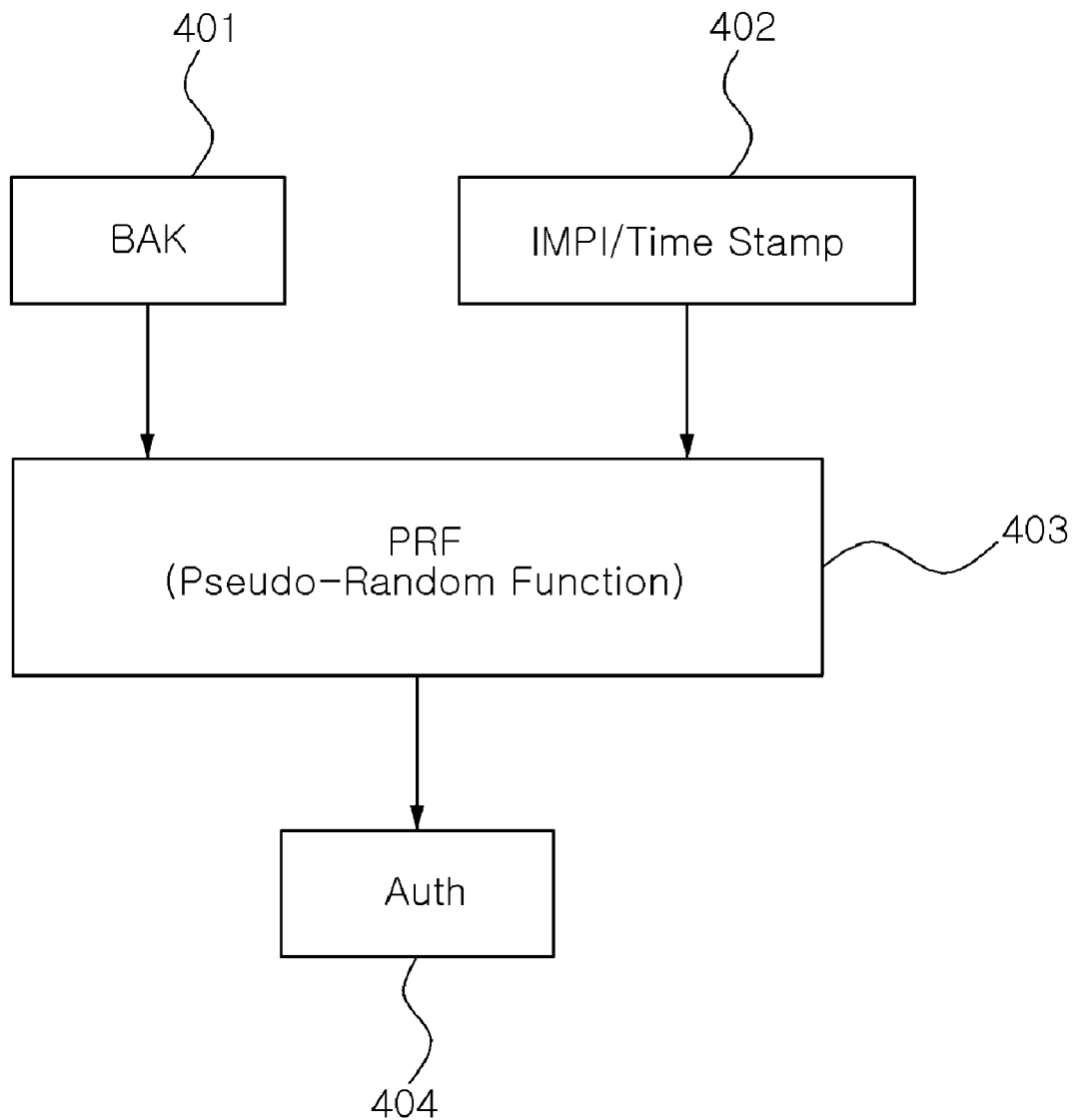
FIG. 4 is a view illustrating the configuration of a subscriber terminal according to another exemplary embodiment of the present invention.

FIG. 4 is a view illustrating the configuration of a subscriber terminal according to another exemplary embodiment of the invention.

Referring to FIG. 4, a subscriber terminal according to this embodiment may include a BAK generation unit 401, an IMPI storage unit 402 and an Auth value generation unit 403.

The BAK generation unit 401 may generate a Bundled Authentication Key (BAK) on the basis of an Extended Master Session Key (EMSK) obtained when access authentication is performed between the subscriber terminal and a server.

An IMS Private User Identity (IMPI), which is a unique identifier of the subscriber terminal, may be stored in the IMPI storage unit 402.

The Auth value generation unit 403 may generate an Auth value using the BAK and the IMPI in order to check whether the subscriber terminal has succeeded in the access authentication. In this embodiment, the Auth value generation unit 403 may include a pseudo-random function calculation part. A pseudo-random function is widely used in computer simulation or statistics. In this embodiment, the Auth value may be output using a pseudo-random function by taking the BAK and the IMPI as input.

Figure 5:
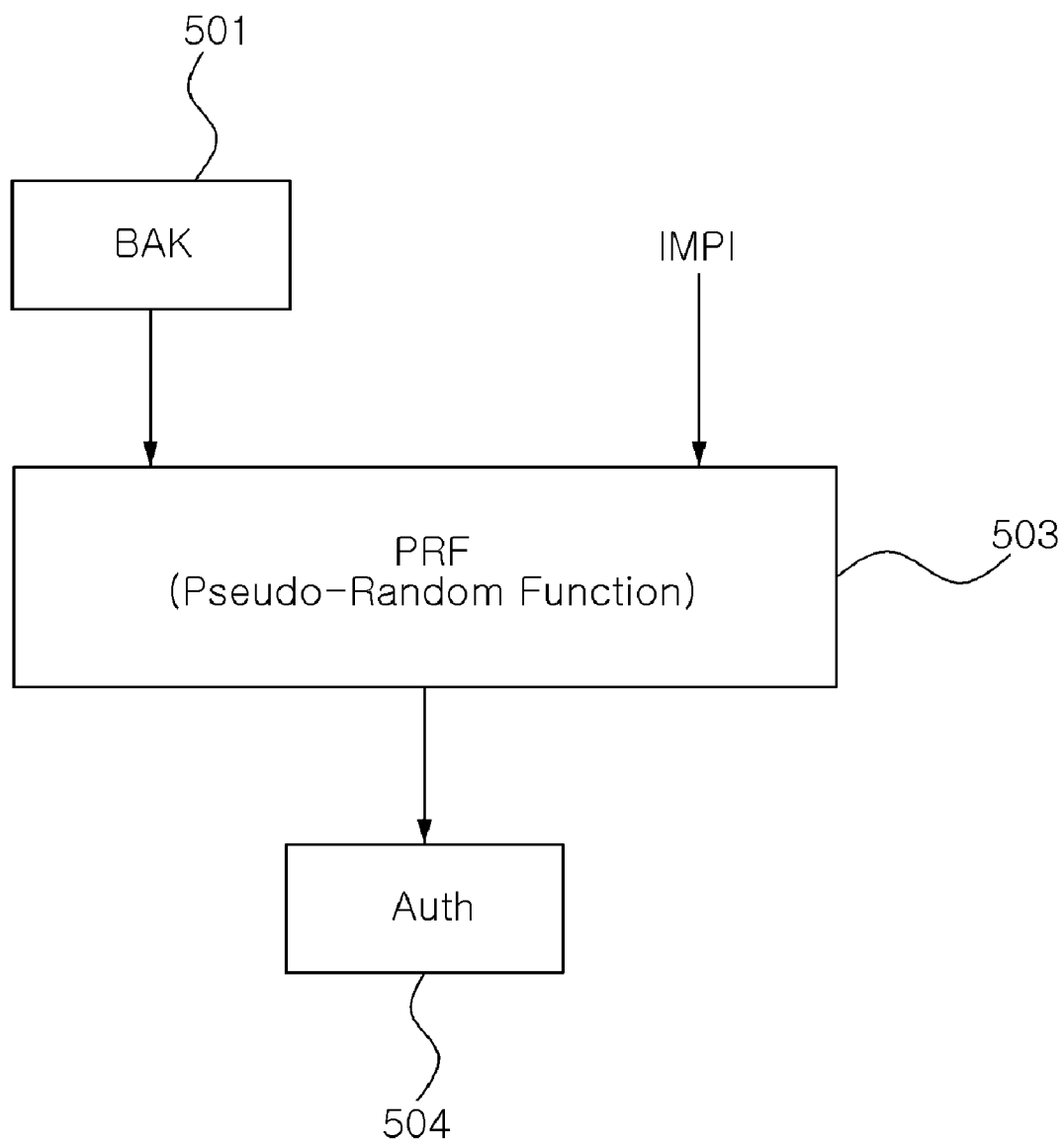
FIG. 5 is a view illustrating the configuration of an integration authentication server according to another exemplary embodiment of the present invention.

FIG. 5 is a view illustrating the configuration of an integration authentication server according to another exemplary embodiment of the invention.

Referring to FIG. 5, an integration authentication server according to this embodiment may include a BAK generation unit 501 and an Auth value generation unit 503.

The BAK generation unit 501 may generate a Bundled Authentication Key (BAK) on the basis of an Extended Master Session Key (EMSK) obtained when an access authentication is performed between a subscriber terminal and the integration authentication server.

The Auth value generation unit 503 may generate an Auth value using the BAK and the IMPI in order to check whether the subscriber terminal has succeeded in the access authentication. In this embodiment, the Auth value generation unit 503 may include a pseudo-random function calculation part. A pseudo-random function is widely used for computer simulation or statistics. In this embodiment, the Auth value may be output using a pseudo-random function by taking the BAK and the IMPI as input. The IMPI (IMS Private User Identity) is a unique identifier of the subscriber terminal.

As set forth above, according to exemplary embodiments of the invention, bundle authentication safe from security attacks can be performed by utilizing a Bundled Authentication Key (BAK) generated on the basis of an Extended Master Session Key (EMSK) that is an encryption key generated during access authentication.

While the present invention has been shown and described in connection with the exemplary embodiments, it will be apparent to those skilled in the art that modifications and variations can be made without departing from the spirit and scope of the invention as defined by the appended claims.

What is claimed is:

1. A bundle authentication system comprising:
    a subscriber terminal calculating a Bundled Authentication Key (BAK) on the basis of an Extended Master Session Key (EMSK) obtained during access authentication and calculating an Auth value using the BAK and an IMS Private User Identity (IMPI) in order to check whether the subscriber terminal has succeeded with the access authentication;
    a first apparatus receiving a register message including the IMPI and the Auth value calculated by the subscriber terminal and then transmitting the IMPI included in the register message to an integration authentication server; and
    an integration authentication server performing the access authentication along with the subscriber terminal, calculating a BAK using the EMSK and an Auth value using the BAK and the IMPI after checking the IMPI transmitted from the first apparatus and finding out that the subscriber terminal is a registered subscriber terminal, and transmitting a response message including the Auth value, the BAK and the IMPI to the first apparatus,
    wherein the first apparatus receives and validates the response message and then transmits a registration success message including the IMPI, the Auth value and the BAK to the subscriber terminal.

2. The bundle authentication system of claim 1, further comprising a second apparatus receiving the registration success message including the IMPI, the Auth value and the BAK transmitted by the first apparatus, storing the BAK therein, and transmitting the registration success message, from which the BAK is removed, to the subscriber terminal.

3. The bundle authentication system of claim 1, wherein the access authentication is based on an Extensible Authentication Protocol (EAP).

4. The bundle authentication system of claim 1, wherein the BAK is calculated on the basis of the EMSK using a pseudo-random function.

5. The bundle authentication system of claim 1, wherein the Auth value is calculated with the BAK using a pseudo-random function.

6. A bundle authentication method comprising:
    performing access authentication between a subscriber terminal and an integration authentication server;
    calculating, by the subscriber terminal, a Bundled Authentication Key (BAK) on the basis of an Extended Master Session Key (EMSK), obtained during the access authentication, and calculating an Auth value using the BAK and an IMS Private User Identity (IMPI) in order to check whether the subscriber terminal has succeeded in the access authentication;

transmitting a register message including the IMPI and the Auth value calculated by the subscriber terminal to a first apparatus;

transmitting, by the first apparatus, the IMPI included in the register message to the integration authentication server upon receiving the register message;

calculating, by the integration authentication server, a BAK on the basis of the EMSK and calculating an Auth value using the BAK and the IMPI after checking the IMPI transmitted by the first apparatus and finding out the subscriber terminal is a registered subscriber terminal;

transmitting a response message including the IMPI, the Auth value and the BAK calculated by the integration authentication server to the first apparatus; and transmitting, by the first apparatus, a registration success message including the Auth value, the BAK and the IMPI to the subscriber terminal after checking the Auth value and the IMPI included in the response message.

7. The bundle authentication method of claim 6, wherein the transmitting of the registration success message to the subscriber terminal further comprises storing the BAK from the registration success message, transmitted by the first apparatus, in the second apparatus and transmitting the registration success message, from which the BAK is removed, to the subscriber terminal.

8. The bundle authentication method of claim 6, wherein the access authentication is based on an Extensible Authentication Protocol (EAP).

9. The bundle authentication method of claim 6, wherein the calculating of the BAK on the basis of the EMSK is performed using a pseudo-random function.

10. The bundle authentication method of claim 6, wherein the calculating of the Auth value using the BAK is performed using a pseudo-random function.

11. A subscriber terminal comprising:
a BAK generation unit generating a Bundled Authentication Key (BAK) on the basis of an Extended Master Session Key (EMSK) obtained when access authentication is performed between the subscriber terminal and a server;
an IMPI storage unit storing an IMS Private User Identity (IMPI); and
an Auth value generation unit generating an Auth value using the BAK and the IMPI in order to check whether the subscriber terminal has succeeded with the access authentication.

12. The subscriber terminal of claim 11, wherein the BAK generation unit comprises a pseudo-random function calculation part.

13. The subscriber terminal of claim 11, wherein the Auth value generation unit comprises a pseudo-random function calculation part.

14. An integration authentication server comprising:
a BAK generation unit generating a Bundled Authentication Key (BAK) on the basis of an Extended Master Session Key (EMSK) obtained when access authentication is performed between a subscriber terminal and the integration authentication server; and
an Auth value generation unit generating an Auth value using the BAK and an IMS Private User Identity (IMPI) transmitted from the subscriber terminal in order to check whether the subscriber terminal has succeeded with the access authentication.

15. The integration authentication server of claim 14, wherein the BAK generation unit comprises a pseudo-random function calculation part.

16. The integration authentication server of claim 14, wherein the Auth value generation unit comprises a pseudo-random function calculation part.

* * * * *